July 30, 1929.    G. R. BOTT    1,722,489
MEANS FOR RETAINING LUBRICANT AND EXCLUDING DUST
Filed May 18, 1926    2 Sheets-Sheet 1

INVENTOR
George R. Bott
BY C. P. Goepel
his ATTORNEY

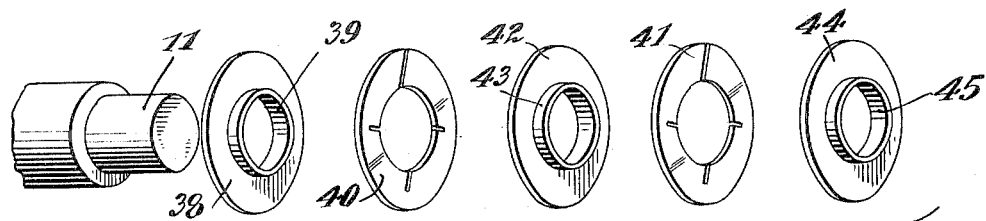
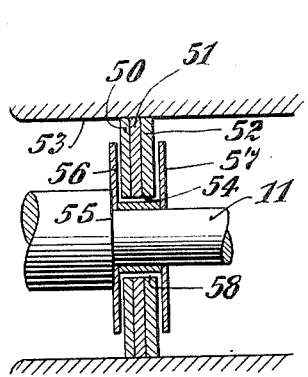
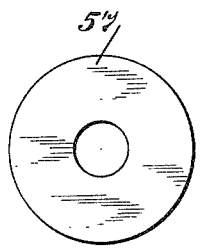
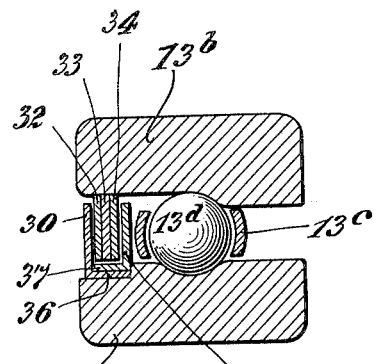
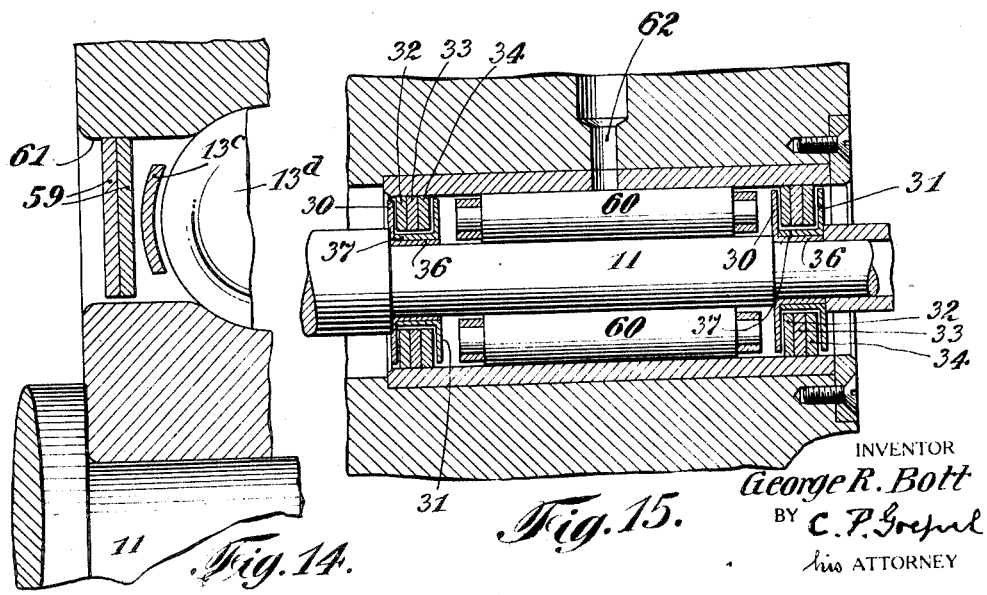

Patented July 30, 1929.

1,722,489

UNITED STATES PATENT OFFICE.

GEORGE R. BOTT, OF MOUNT VERNON, NEW YORK, ASSIGNOR TO NORMA-HOFFMANN BEARINGS CORPORATION, OF STAMFORD, CONNECTICUT, A CORPORATION OF NEW YORK.

MEANS FOR RETAINING LUBRICANT AND EXCLUDING DUST.

Application filed May 18, 1926. Serial No. 109,815.

This invention relates to means for anti-friction bearings for retaining lubricant and excluding dust and has application to both bearings of the closed as well as open type and also to roller bearings.

Most all anti-friction bearings require for their efficient use a constant supply of lubricant and in certain practices it is most favorable to have the anti-friction bearings operate within a lubricant in the form of grease which is held relatively to the bearings so that the operative parts of the bearings are at all times within such mass of grease or are influenced thereby. Other requirements must be satisfied and these are met by providing dust excluding means so as to prevent any dust, dirt or grit from coming into the path of the moving parts of the bearings. This latter part is particularly important in respect to mechanisms which require for their best operation great accuracy of workmanship and which demand the use of bearings made to great accuracy and finish.

Various lubricant enclosing means, as also dust excluding means have heretofore been proposed but it is believed that the present invention is an improvement thereover.

The object of the present invention is to provide a very simple mechanism which may in certain cases act as an independent article of manufacture and which may as such be readily applied to mechanisms utilizing ball or roller bearings, so that such ball or roller bearings may be enclosed to include lubricant and at the same time be protected from the entrance of dust, dirt or grit or the like. A further object is to provide as a separate article of manufacture an attachment that may be easily applied, and in certain cases separately sold.

Among other things my invention comprises the use of split washers which are so arranged as to be forced within a portion of the mechanism so as to be held in stationary position in respect to the stationary parts of the mechanism but which permit a free movement or rotation of the moving parts of the mechanism. These split washers are so arranged in respect to the anti-friction bearings as to be on either one or the other side or both sides thereof depending upon the use to which the mechanism having the anti-friction bearings is intended to be put. In order to provide a very simple means enabling such washers to be applied to the mechanism, I provide holding means for such washers so that after the holding means and such washers have been assembled they may be readily applied to the mechanism in proper relation to the anti-friction bearings. In other cases such holding means with washers may be applied to the bearing directly either at one side or both sides of the balls or rollers of said bearings. In certain cases the bearings may be provided with such washers without the holding means, suitable holding means being provided within the parts of the bearings themselves.

The provision in the washers of cut-outs which thereby form split washers is for the purpose of enabling their ready application to the parts of the mechanism and at the same time produce an anchoring effect.

In the accompanying drawings,

Figure 10 is an isometric view of the several parts composing the closure means of Fig. 8.

Figure 11 is a sectional view of another embodiment of closure means and washers.

Figure 12 is a plan view of one of the holding means of Fig. 11.

Figure 13 is a section of a bearing of the open type showing the structure of Fig. 6 applied to one side thereof.

Figure 14 is a partial section of a bearing showing the washers applied thereto, and Figure 15 is a central longitudinal section of a roller bearing having an embodiment of my invention applied to both sides thereof.

Similar characters of reference indicate corresponding parts throughout the various views.

Figure 1:
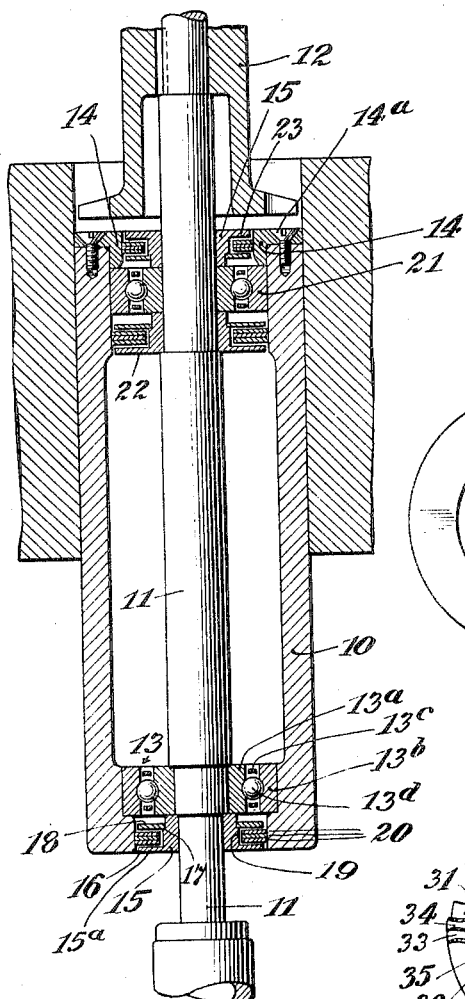
Figure 1 shows a spindle shaft having at the lower end thereof a unit type of ball bearing and with my improved lubricant holder and dust excluder below the ball bearing, and on the upper end of this spindle shaft unit a type of bearing with the closure device shown on both sides of the bearing.

Referring to the drawings and more particularly to Fig. 1, the mechanism there shown has a suitable casing 10 and shaft 11 having a pulley 12 secured thereto. Between the shaft 11 and the casing or housing 10 an anti-friction bearing is disposed which bearing 13 is of the unit type having the inner race 13ᵃ secured to the shaft 11 and the outer race 13ᵇ mounted with a slip fit in the housing 10, a cage 13ᶜ of well known construction holds the balls 13ᵈ in position. Upon the shaft 11 a collar 15 is fitted in such a manner as to rotate therewith. This collar 15 does not contact with the collar 14 but a space 16 is left therebetween so as to provide freedom of movement between these parts. The collar 15 is provided with a shoulder 17 against which a ring 18 is placed and held therein by a frictional hold. This ring 18 extends peripherally to about the same expanse as the collar 15 so as to provide a similar fine clearance between this ring 18 and the collar 14, the clearance therebetween being substantially equal to the clearance 16. Disposed between the extension of the collar 15 and the ring 18 is a plurality of split washers which huggingly contact with the interior bore of the collar 14 or housing 10 but which do not contact with the exterior body of the collar 15, but leave a clearance 19 therebetween. These clearances 19 and 16 and the spaces between the members 15ᵃ, 18 and 20 are determined to provide necessary clearances. In some of the drawings, the relationship of the parts is somewhat exaggerated. These washers may be any of the forms shown in Figs. 2, 3 and 4. The sides of the washers 20 have a small clearance between the walls of the extension 15ᵃ and the ring 18. Thus as the clearance 16 is small and any passage therefrom to the bearings is not substantially larger than this clearance, any dirt or grit will be prevented from passing in through this barrier or this closure member, and likewise any lubricant or grease of the bearing 13 will be prevented from passing through and out of the closure member. This because of the relation of stationary to moving members.

In the upper end of Fig. 1, a unit or closed type of bearing 21 is shown and this is provided at one side thereof with a closure member 22, similar to that described on the lower end of Fig. 1, and another closure member 23 also similar to that described on the lower end of Fig. 1. On this upper end of Fig. 1, two closure members 22 and 23 are shown. Exterior to the bearing 21 is arranged a collar 14 which seats on the housing 10 and abuts against the outer race of bearing 21. It is held by a screw 14ᵃ. This collar 14 remains stationary with the housing 10. I have shown a unit or closed type of bearing but I do not wish to be confined thereto, as other types may be adapted to the structure or a roller bearing may be utilized.

Figure 2:
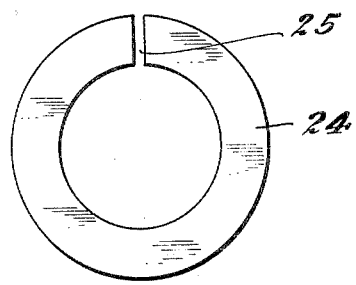
Figure 2 is a plan view of a split washer of one form.
Figure 3:
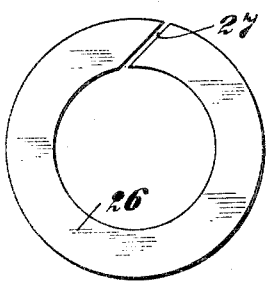
Figure 3 is a plan view of another form of split washer.
Figure 4:
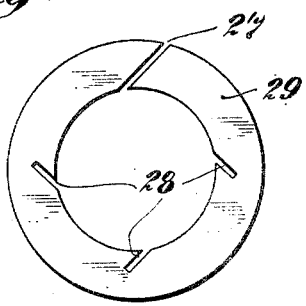
Figure 4 is a plan view of still another form.

In Figs. 2 to 4 various forms of split washers are shown. The split washer 24 of Fig. 2 has a radial slot 25; the split washer 26 of Fig. 3 has a slot 27 inclined to the radius; and the split washer of Fig. 4 has the same cut-out 27 as shown in Fig. 3 and in addition thereto inclined cut-outs 28 along the interior bore with the washer 29 shown in Fig. 4. Various forms of cut-outs may be readily provided. The function of the cut-outs 25 and 27 being to permit a ready reduction in diameter of these washers and to hold them in position when they are compressed and placed in position.

Figure 5:
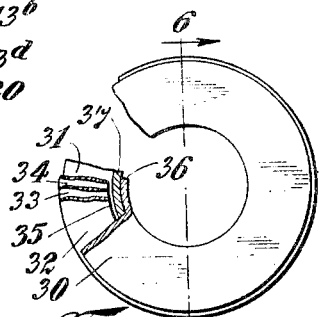
Figure 5 is a plan view of the structure shown in Fig. 6, with parts broken away.

In Figs. 5 to 10, I have shown various closure members utilizing the washers shown in Figs. 2 to 4. In the embodiments shown in Figs. 5 and 6, two L-shaped rings 30 and 31 are disposed in relation to each other so as to provide a holding device for three washers 32, 33 and 34. It will be noticed that there is a clearance space 35 between the interior bore of these washers and the exterior surface of the member 31. In Fig. 5 the parts are shown as broken away. The L-shaped members 30 and 31 each have a portion substantially parallel to the axis of the shaft to which they are to be applied, the member 30 having the portion 36 and the member 31 having the portion 37, the portion 37 seating upon the exterior part of the portion 36 preferably by a frictional hold. In Figs. 7 to 10 another embodiment is shown in which the L-shaped members 38 have a shorter member 39 than the member 36 of Fig. 6, the length of the member 39 being to take care of one washer 40 with clearances. Several of these members 38 are placed adjacent to each other and thereby hold the washers 40 and 41 in position, the adjacent members being indicated by 42 with its bore 43 and 44 with its bore 45, the advantage of this assembly is its long labyrinthic path.

Figure 7:
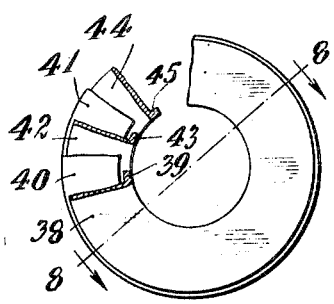
Figure 7 is a plan view showing parts broken away of another form of closure means with washers.
Figures 8, 9:
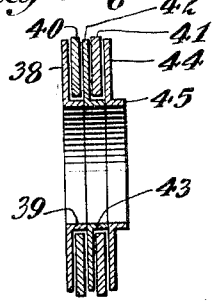
Figure 8 is a section taken on line 8—8 of Fig. 7.
Figure 9 is a section of one of the elements shown in Fig. 8.

In Fig. 9 a single member 38 with its member 39 and washer 40 is shown. In Fig. 7 the various parts shown in Fig. 9 are shown in their assembled position but with parts broken away and in Fig. 10 the various parts are shown in their separated position. In Fig. 10 I have shown the washers 40 and 41 of substantially the same form as shown in Fig. 4 but it is clear that any other shape as that in Figs. 2 and 3 may be utilized.

In Fig. 11, I have shown the washers 50, 51 and 52 having their peripheral surfaces huggingly contacted with the portion 53 and having their interior bore surfaces providing the clearance 54. The shaft 11 is provided with a shoulder portion 55 which holds in position a ring 56, and along the shaft 11 another ring 57 is provided. Both the rings 56 and 57 are suitably held upon the shaft 11. The washers 50 and 51 and 52 may be either one of the shapes shown in Figs. 1, 2, 3 and 4.

In Fig. 12 a plan view of the rings, either 56 or 57, is shown. The interior bore is slightly smaller than the exterior circumference of the shaft 11 so as to make a press fit over the shaft 11 and be held in position thereby. In the same manner the washers 50, 51 and 52 due to the exterior cut-outs as for instance 25 or 27 are permitted to be slipped into position along the surface 53. A space 58 is provided.

Figure 6:
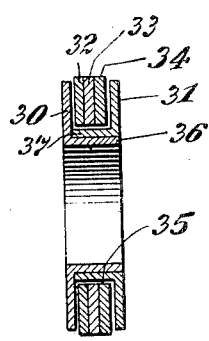
Figure 6 is a section taken on line 6—6 of Fig. 5.

In Fig. 13 I have shown an open type of bearing and on one side thereof the application to the race rings, of the bearings, of a structure as shown in Fig. 6. It is clear that a closed type of bearing may be utilized or a roller bearing may be utilized as in Fig. 15, the embodiment of Fig. 13 being simply shown to show the application of one or the other forms of the closure members directly to the race rings of any suitable type of ball or roller bearing.

In Fig. 14 I have shown the movable race ring provided with washers 59, which have peripheral cut-outs. These washers 59 with the exterior cut-outs are somewhat compressed so as to slide along the surface 61 and when in proper position to huggingly contact therewith. This shows a very simple form of application of the washers to the race rings of the bearing.

In Fig. 15, I have shown roller bearings 60, with an embodiment of my improved dust excluder and lubricant retainer applied to both ends of the roller bearings. Lubricant may be supplied by the channel 62. The embodiment applied is that of Fig. 6, but that of Fig. 8 or that of Fig. 14 may be applied.

From the foregoing it will be seen that my improved lubricant retainer and dust excluder may be applied to mechanism having ball or roller bearing either in the form of the "assembling on the job" manner as shown in Fig. 11 in which the ring 56 is first applied to the shaft 11 then the washers 50, 51 and 52 and then the closing ring 57. In this connection it will be mentioned in passing that the rings 56 and 57 do not extend as far up toward the bearing surface 53 as the corresponding portions do in Fig. 1. The furtherest extension as shown in Fig. 1 has many advantages in that these parts act as barriers but the form shown in Fig. 11 is shown as shorter so as to show another embodiment. Or instead of "assembling on the job" the washers may be held in position by closure means as shown in Fig. 6 or Fig. 9 and these closure means with the washers as a separate entity may be assembled to the parts to which they belong. In the latter case, a separate industry or manufacture for such complete entities may be initiated just as in the same manner that ball bearings are now sold as separate entities so these enclosed washers may be supplied to users desiring lubricant retainers and dust excluders. Or in certain other cases the bearings after they have been assembled may have assembled thereto the washers as shown in Figs. 13 and 14 and the entire bearing with lubricant retainers and dust excluders may be directly supplied to the users.

It will be noted that the washers always remain stationary in the bore while the shaft inner bearing ring, cage and balls revolve.

The angular cut-outs in the washers are preferable to the radial, in that when they overlap the notches cross and thereby effectively minimize the opening through which any lubricant or dust may pass. The inside notches are to give a certain amount of flexibility or yieldability to the flat shaped ring so that it may accommodate itself to the bores for which it is made, at the same time permitting it to be say 5/1000 or even 10/1000 of an inch over size. In the arrangement of the washers such as shown in Figs. 3 and 4, it is preferable to have one or more of the washers reversed so as to make the most effective seal and thereby prevent any of the notches from registering and minimizing thereby a possible open area for the passage of the lubricant. When the washers are once pressed into the housing they remain there by frictional contact. In certain cases the upper side of the supplied ring holding unit acts as a throw ring on the lubricant when the shaft or spindle is in operation always throwing any lubricant tending to escape outward.

The washers may be readily punched out of blanks with the satisfactory outside diameter then ground on the centerless grinding machines in large quantities and at a minimum cost. No accuracy is required beyond that they be anywhere from 2/1000, 5/1000 or even 10/1000 of an inch larger than the bore in which they are to be used. This provides very liberal tolerances and the spring adjustment feature with the washer takes care of the fit. When once pressed into the bore they fit to remain rigidly fixed and they do not move. Even assuming that they might be pushed into a position not perpendicular to the axis of rotation, it is an assured fact that they will soon be straightened out into a position absolutely perpendicular to the axis of rotation as soon as the highest point of the revolving part of the unit makes several complete revolutions. They will be kicked away and be free thus giving a frictionless closure.

I have shown various embodiments of my invention and various applications of my invention but it is clear that I do not wish to be limited to the details thereof as changes may be made therein without departing from the spirit of my invention as defined in the appended claims.

I claim as new.

1. Means for retaining lubricant and excluding dust for anti-friction bearings mounted between relatively movable parts, comprising split washers deformable into position relative to one of said parts and having inherent resiliency sufficient to bind the washers to said part when the washers are released, and cooperable guiding means mounted upon the other part and overlapping said washers, said washers and guiding means being spaced from and relatively movable with respect to each other.

2. Means for retaining lubricant and excluding dust for anti-friction bearings arranged between relatively movable parts comprising a plurality of split washers compressible into position within one of said parts and having sufficient inherent resiliency for binding against said part, the inner edges of said washers being spaced from the other part, and guiding means having outstanding flanges carried upon said other part and overlapping said washers and spaced from the first named part to permit free relative turning of said parts and for sealing the passage between the washers and the said second named part.

3. Means for retaining lubricant and excluding dust for anti-friction bearings disposed between relatively movable parts, comprising a plurality of split washers compressible into position within one of said parts and possessing sufficient inherent relisiency for binding within the movable member said washers each having a slit arranged diagonally with respect to the slits of the adjacent washers and said washers being spaced from the other part, and guiding means mounted on said part and extending outwardly therefrom at the sides of the washers and overlapping the same and spaced from said first named part.

4. Means for retaining lubricant and excluding dust for anti-friction bearings disposed between relatively movable members comprising a plurality of split washers having slits therein arranged diagonally with respect to one another and being compressible into position within one of said relatively movable members, said washers adapted to expand and bind against said member and being spaced at its inner edge from the other member, and cooperating means on said latter member having a hub portion adapted to extend through the washers and having flange portions extending outwardly and overlapping the washers, said flange portions being spaced from said first named member to permit free relative rotation of said members.

5. Means for retaining lubricant and excluding dust for anti-friction bearings disposed between relatively movable members, comprising a plurality of split washers, each washer having a slit and each slit of each washer arranged diagonally to a slit of the adjacent washer, said washers being compressible into position within one of the members and possessing sufficient inherent resiliency to bind the washers against said member and being spaced from the other member, and means carried by said latter member for guiding the washers in position without rotating the washers, said means including angular members arranged in relatively fixed juxtaposition to the washers, and having flange portions lying adjacent to the sides of the washers.

6. In a bearing, inner and outer members one rotatable relative to the other, a plurality of independently rotatable anti-friction bearing elements interposed between said inner and outer members, and lubricant retaining and dust excluding means at one side of the bearing including a plurality of diametrically contractable annular plates engaged with each other and positioned between said inner and outer members in frictional binding engagement at one of their edges with one of said members and free from contact at their other edges with the other of said members, and sealing means carried by the latter member and cooperating with said plates.

7. In a bearing, inner and outer annular bearing members having races in their opposed faces, a plurality of anti-friction bearing elements interposed between said members and engaged in said races, and lubricant retaining and dust excluding means arranged between said members at one side of said bearing elements and consisting of a diametrically contractable annular plate urged by its inherent resiliency into binding frictional contact throughout one of its edges with the face of one of said bearing members and thereby retained in position with its other edge in clearance relation to the opposed face of the other bearing ring, and sealing means secured in fixed relation to the latter bearing ring and cooperating with said plate.

8. In a bearing, in combination with inner and outer members one rotatable relative to the other and a plurality of anti-friction elements arranged between and directly engaging the opposed faces of said members, lubricant retaining and dust excluding means at one side of the bearing comprising a plurality of diametrically contractable annular plates positioned in parallel planes beneath said members and urged by their inherent resiliency into binding frictional engagement at one of their edges with one of said members, and spaced guide flanges on the other of said members between which said annual plates are positioned, and said flanges having overlapping hub extensions encircling the latter bearing member and out of contact with the other edges of said annular plates.

In testimony that he claims the foregoing as his invention, he has signed his name hereto.

GEORGE R. BOTT.